United States Patent [19]

Johansson et al.

[11] Patent Number: 4,829,229
[45] Date of Patent: May 9, 1989

[54] SERIES CAPACITOR EQUIPMENT

[75] Inventors: Rutger Johansson, Ludvika; Lars Paulsson, Västerås, both of Sweden

[73] Assignee: ASEA Brown Boveri AB, Västerås, Sweden

[21] Appl. No.: 188,346

[22] Filed: May 4, 1988

[30] Foreign Application Priority Data

May 4, 1987 [SE] Sweden .................. 8701825

[51] Int. Cl.$^4$ .................................. G05F 1/70
[52] U.S. Cl. .................... 323/209; 323/352; 323/364
[58] Field of Search ........... 323/209, 340, 341, 352, 323/364

[56] References Cited

FOREIGN PATENT DOCUMENTS 759533 12/1943 Fed. Rep. of Germany .
714528 12/1941 Fed. Rep. of Germany .
892181  7/1949 Fed. Rep. of Germany .
1118858 12/1961 Fed. Rep. of Germany .
706905 12/1979 U.S.S.R. .

OTHER PUBLICATIONS

ASEA Pamphlet ZF22-007E, published by ASEA Brown Boveri AB, Vasteras, Sweden, 1985.
IEE Proc., vol. 128, Pt. c, No. 6, Nov. 1981: "EHV Series Capacitor Equipment Protection and Control" (N. T. Fahlin).

Primary Examiner—Patrick R. Salce
Assistant Examiner—Jeffrey Sterrett
Attorney, Agent, or Firm—Pollock, Vande Sande & Priddy

[57] ABSTRACT

The reactance of series capacitor equipment connected to an electrical transmission power line can be changed during operation with the aid of a transformer on-load tap-changer which switches in or out a variable number of capacitor modules. The tap-changer comprises a tap selector, the contacts of which in currentless state can be moved between the capacitor steps, and a diverter switch with a plurality of sequentially operating contact members and with resistors arranged to prevent direct short-circuiting of the capacitor steps. The tap-changer can be at line potential and operated remotely by contact-moving means at ground potential.

6 Claims, 3 Drawing Sheets

SERIES CAPACITOR EQUIPMENT

TECHNICAL FIELD

The present invention relates to series capacitor equipment for connection into an electrical power line, the equipment including means for changing, during line operation, the reactance of the equipment.

DISCUSSION OF PRIOR ART

Series capacitors are widely used in transmission lines for transmission of electrical power to compensate for the inductance of the line. Because the inductance of a line is so compensated, considerable advantages are gained, above all an increase in the power transmission capacity of the line.

From the abstract of Russian Patent No. 706 905 it is previously known to vary the total capacitance of series capacitor equipment by switching in and out one single subcapacitor connected in series with the fixed capacitor bank of the equipment. The total capacitance can only be varied in two steps. Nothing is mentioned about the design of the switching member or about how the energy for its control and operation is obtained.

From German Patent Nos. 714,528 and 759 533 it is known to arrange a tap selector and a diverter switch for connecting shunt capacitors into a network and for disconnection and discharge of the capacitors, respectively. These switching members are not traversed by the load current in that power line to which the capacitor equipment is connected. The requirement for current handling capacity and reliability are therefore much lower than in series capacitor equipment, which has to manage error currents in the network.

German Patent No. 892 181 describes a device for use in a synchronously operating on-load tap-changer. There is no suggestion the described device could be used in connection with series capacitor equipment.

OBJECTS OF THE INVENTION

One object of the invention is to provide series capacitor equipment which has a capacitance which is controllable in several steps. A second object is to provide such capacitor equipment which has a practical and economically favorable construction, a high working life and low service requirements.

SUMMARY OF THE INVENTION

Equipment according to the invention comprises a plurality of mutually series-connected capacitor modules and switching members connected thereto, for switching-in and switching-out a variable selected number of capacitor modules into a power line. The switching members comprise a transformer on-load tap-changer with sequentially operating contact members a well as impedance elements arranged so as to prevent direct short circuiting of the capacitor modules during the switching operations. The contact members of the tap-changer are arranged at the potential of the power line on a platform insulated from ground potential. The drive means of the tap-changer are arranged at ground potential and connected to the contact members with the aid of electrically insulating members for transmission of the required operating movements.

By changing the capacitance of the series capacitor, the degree of compensation can be changed by steps. This means that the power fluxes in large alternating voltage networks can be continuously influenced, which provides a possibility of minimizing the line losses, of increasing the power transmission capacity and the reliability, and of increasing the possibilities for electrical energy transition through a network.

By arranging the switching members at the potential of the power line on a platform insulated from ground potential, preferably on the same platform as the capacitors, no requirements or only low requirements for electrical insulation are placed on the switching members, on its bushings and leads, etc., which provides substantial economical and practical advantages.

In equipment according to the invention, the switching members consist of such switching members as are used in on-load transformer tap-changers. These switching members are robust and relatively inexpensive, they have a high reliability and can withstand a very large number of switching operations between overhauls. Furthermore, such switching members include the impedance elements which are required for a switching of the capacitor bank which is favorable from the point of view of damping current surges.

A switching member of the kind used for on-load tap-changers will have low losses and a sufficiently high speed of action to enable control of the power flux in a transmission network. The normally significant problem of arranging a main circuit component at a high potential relative to ground (difficulties in supplying auxiliary and driving power, difficulties with respect to supervision, overhaul and repairs) are solved according to preferred embodiments of the invention in a simple and advantageous way. That part of the on-load tap-changer which requires auxiliary power and frequent maintenance, namely the drive device, can be held at ground potential and the necessary drive connection to the tap-changer can be via one or more insulated rods, shafts or the like. In this way the problem of transmitting control signals for switching of the series capacitor from ground potential to the potential of the power line is eliminated.

BRIEF DESCRIPTION OF THE DRAWINGS

The invention will now be described in greater detail, by way of example, with reference to the accompanying drawings, wherein.

DESCRIPTION OF PREFERRED EMBODIMENTS

Figure 1:
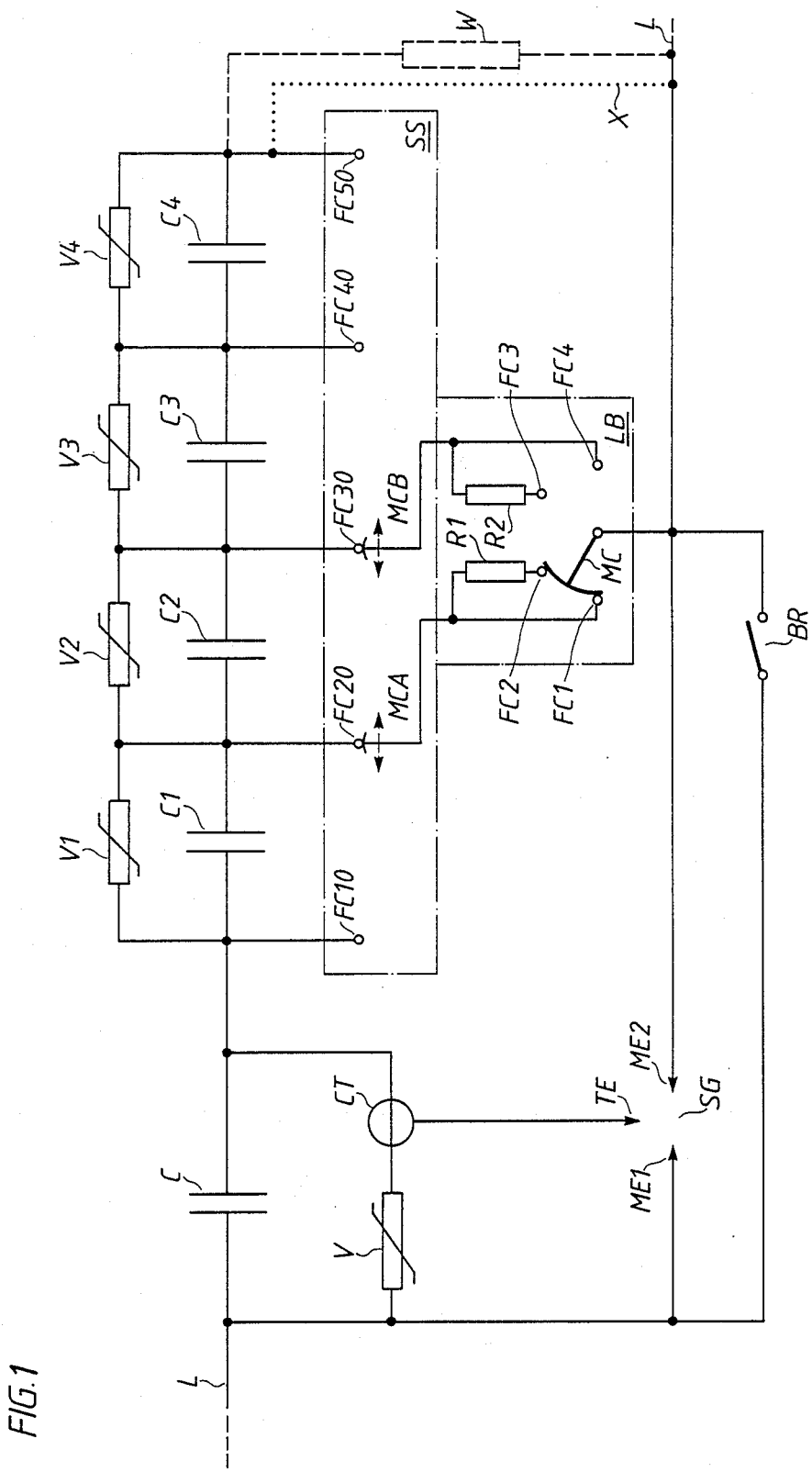
FIG. 1 shows a first embodiment of series capacitor equipment according to the invention, the capacitor bank having one fixed main part and a plurality of switchable parts, an on-load tap-changer comprising a tap selector and a diverter switch being used for switching the capacitor parts in and out of circuit.

FIG. 1 shows one phase of series capacitor equipment according to the invention. Normally, such equipment has three phases and in that case two additional capacitor equipment units are arranged for the other phases of the power line, each additional unit being designed in the same way as the unit shown in FIG. 1. The actual series capacitor is switched into a power line L and comprises one fixed main part C and a number of optionally usable switchable capacitor parts or modules C1-C4. Each capacitor part is built up in a known manner of a plurality of series- and/or parallel-connected capacitors. The main part C is so dimensioned as to provide the major proportion of the reactive power of the capacitor equipment, whereas each one of the capacitor parts C1-C4 is responsible for a smaller proportion. FIG. 1 shows only four switchable capacitor parts, but more or less than this number may be provided. The size of each switchable capacitor part is adapted such that switching steps of a suitable size is obtained.

The switching members shown in FIG. 1 consist of on-load tap-changer equipment with one tap selector SS and one diverter switch LB. The diverter switch is of the type included in tap-changers for power transformers. The diverter switch may, for example, be of the kind described in ASEA pamphlet ZF22-007E (published by ASEA BROWN BOVERI AB of Västerås, Sweden), FIG. 3 (unit b) and FIG. 12. Such a diverter switch has four fixed contacts FC1-FC4. Further, it has one movable contact MC which is designed so as to make contact with two, but not three, of the fixed contacts. The fixed contacts FC1 and FC4 are directly connected to movable contacts MCA and MCB of the tap selector SS. The fixed contacts FC2 and FC3 are connected to the respective movable contact MCA or MCB of the tap selector via a respective resistance R1 or R2. The tap selector may, for example, be of the ASEA type UC, which is described in the above-mentioned ASEA pamphlet ZF22-007E. The tap selector SS has a number of fixed contacts FC10-FC50, which are contactable in turn by the two movable contacts MCA and MCB. In a manner well known in connection with the operation of tap-changers, a first one of the movable contacts (MCA in FIG. 1) in stationary state is current-carrying and the other contact (MCB in FIG. 1) is currentless. The currentless contact can thus be moved to the desired adjacent fixed contact, whereupon a switch over of current flow contact MCA to the contact MCB is made by moving contact MC of the diverter switch LB first into contact with FC2 and FC3 and then into contact with FC3 and FC4. In the position shown in FIG. 1, the movable contact MCA connected to the contact FC20 is connected to the power line L via the diverter switch. The capacitor step C1, but not the other steps, is then connected in series with the main capacitor bank C. Connection of one further capacitor step—C2—can now be performed by connecting the movable contact MCB of the tap selector with the aid of the diverter switch, the contact MCA thus becoming currentless. The latter contact can then be moved, in currentless state, to the desired fixed contact, for example FC40, whereupon a connection of one further capacitor step—C3—can be made with the aid of the diverter switch. Thus additional capacitance can be added to or taken from the line L as need dictates.

During the short interval in the movement of the contact MC of the diverter switch when it makes contact with both of the fixed contacts FC2 and FC3 current can be shared between the resistors R1 and R2 as the newly connected capacitor is being charged up to line potential.

When disconnecting a capacitor step, the resistors R1 and R2 prevent the capacitor step from being short-circuited via the movable contact MC.

The capacitor equipment should be provided with protective means, for example according to the principles described in IEEE PROC., Vol. 128, Pt. C, No. 6, November 1981: "EHV series capacitor equipment protection and control" (N. T. Fahlen). Each capacitor part is provided in a known manner with an overvoltage protective means in the form of a varistor, V, V1-V4. A triggered spark gap SG is connected in parallel with the entire equipment. The spark gap has two main electrodes ME1 and ME2 and an ignition electrode TE, which triggers the spark gap in dependence on the current through the varistor V. The varistor current is sensed with the aid of a current transformer CT connected in series with the varistor. In parallel with the entire series capacitor there is a bypass breaker BR, which in undisturbed operation is open as shown but which is automatically closed in the event of a fault appearing in the equipment.

If desired, an impedance element W may be connected between the power line L and the free end of the outermost capacitor step C4. The impedance element may, for example, consist of a resistor, typically with a resistance of 100 ohm. This impedance element is shown in FIG. 1 in dashed lines. Alternatively, as shown by dotted line X in FIG. 1, the free end of the capacitor step C4 may be directly connected to the power line L. These three alternatives shown in FIG. 1 are all useful and offer different advantages. However, the lowest demands on the breaking capacity of the diverter switch LB arise if there is no connection at all between the capacitor step C4 and the power line L, since then the capacitor steps located to the right side of the illustrated position of the tap selector, as shown in the Figure, do not take part in the switching operation.

Figure 2:
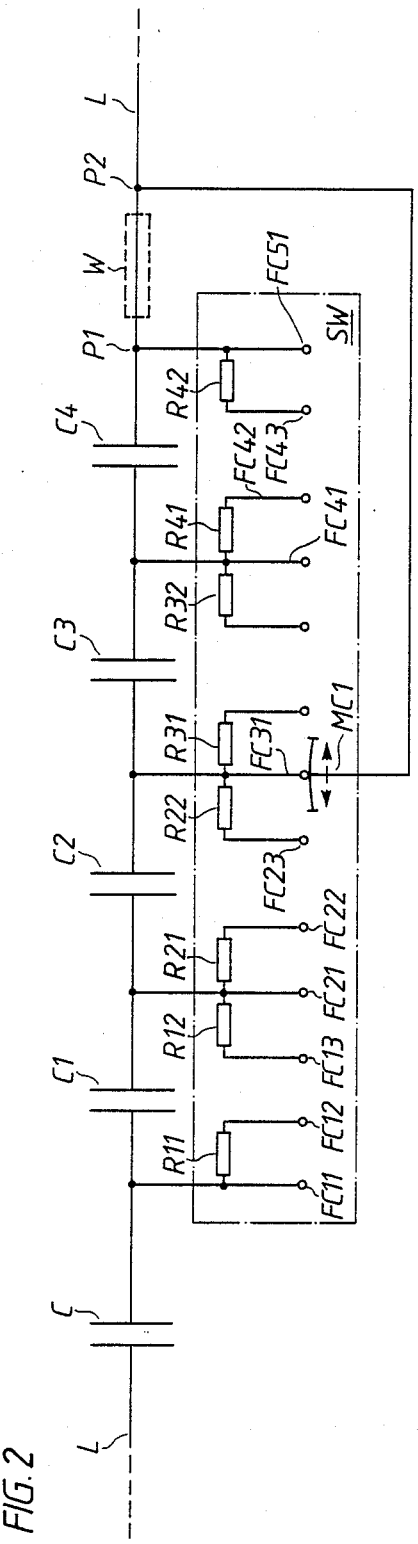
FIG. 2 shows a second embodiment of equipment according to the invention, in which a tap-changer designed as a so-called selector switch is used for switching the capacitor steps in and out of circuit.

FIG. 2 shows a second embodiment of the invention, in which the switching member for switching-in and -out of the additional capacitance consists of a so-called selector switch of the type used for switching windings in and out in a power transformer. The selector switch has one movable contact system MC1, which moves between a set of fixed contacts FC11-FC51. The fixed contacts FC11, FC21, etc. are directly connected to the capacitor steps shown as C1 . . . C4 as before. Between each such pair of fixed contacts, two additional fixed contacts, for example FC12 and FC13 and FC42 and FC43, are arranged and, via resistors R11, R12, and R41, R42 are connected to the capacitor steps. The movable contact system MC1 makes contact with two fixed contacts at a time but not with three contacts. The contact MC1 is shown in FIG. 2 in a stationary position in which the capacitor steps C3 and C4 are short-circuited and, therefore, bypassed. When, for example, it is required to switch out the step C2, the contact MC1 is moved to the left in FIG. 2 until it eventually makes sole contact with the contact FC21. During the switching sequence to arrive at this condition, the contact MC1 makes contact with both contacts FC23 and FC22 thus bringing the resistors R22 and R21 into circuit and preventing a direct short-circuiting of the capacitor step C2.

In the same way as described with reference to FIG. 1, the connection between points P1 and P2 can be completely omitted, or can be replaced by an impedance element W.

The selector switch shown in FIG. 2 is only one example of such switches. An alternative embodiment of selector switch which can be used in equipment according to this invention is the ASEA selector switch type UZ, described in the above-mentioned ASEA pamphlet ZF22-007E and in the ASEA catalogue BO4-0028E. Such a selector switch has one single contact system with one main contact and two auxiliary contacts as well as two resistors connected in series with the auxiliary contacts. The number of contacts and resistors is therefore smaller than in the embodiment shown in FIG. 2, and the selector switch is therefore simpler and economically more favorable.

Figure 3:
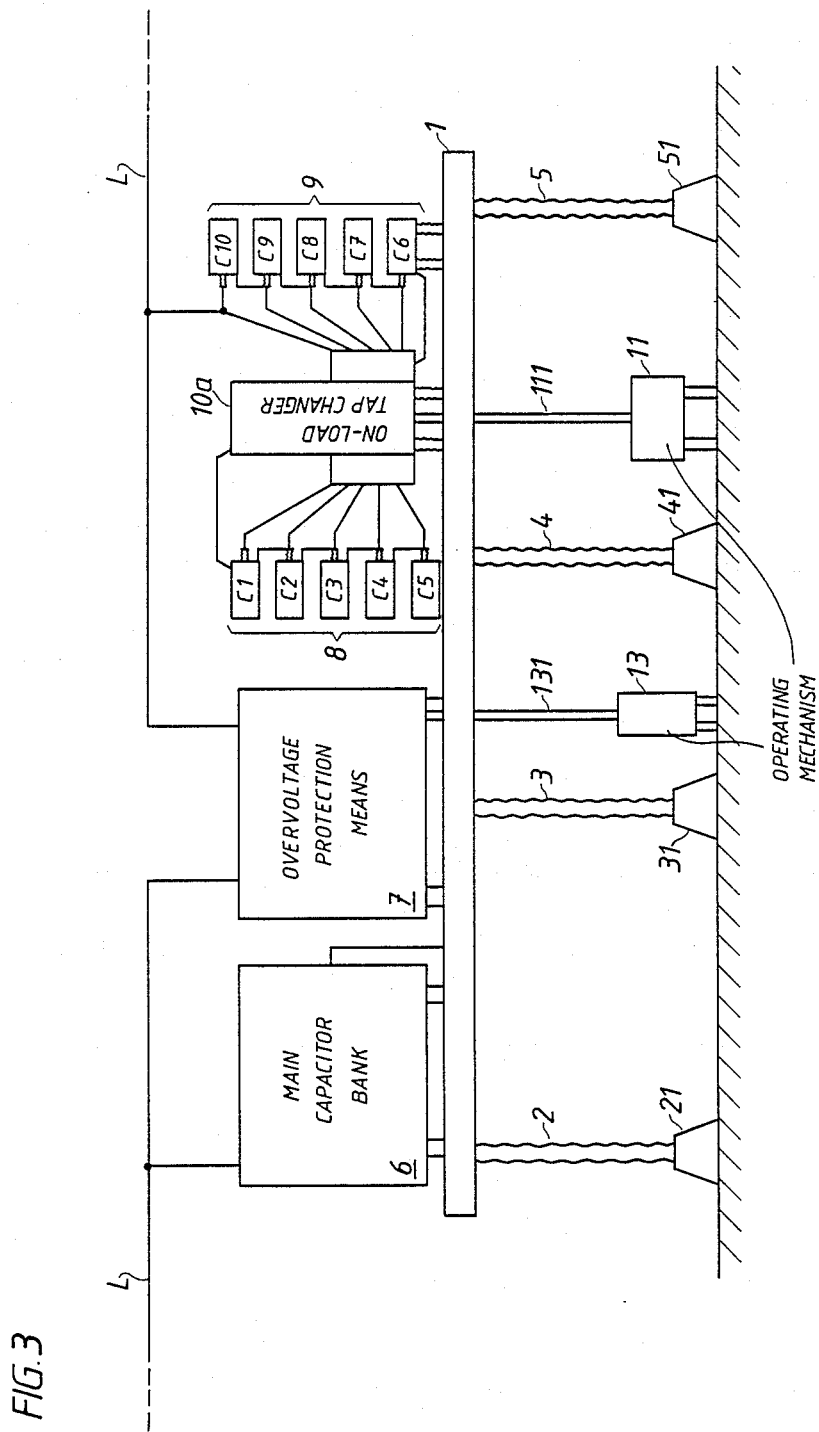
FIG. 3 shows, schematically, one example of the physical construction of equipment according to the invention.

FIG. 3 shows, purely schematically, one example of the practical lay-out of equipment according to the invention. The equipment is arranged on a platform 1, which is maintained at the potential of the power line L. The platform is supported by electrically insulating columns 2, 3, 4 and 5, which reset on base plastes 21, 31, 41 and 51. The main part C of the capacitor bank is designated 6 in FIG. 3. Unit 7 comprises overvoltage protective means in the form of varistors and spark gaps as well as a bypass breaker. The operating mechanism 13 of the bypass breaker is placed at ground potential and the operating movement is transferred to the breaker with the aid of an electrically insulating rod 131. The switchable capacitor steps C1 . . . C10 are shown at 8 and 9 in FIG. 3 and they are located on either side of an on-load tap-changer for switching the capacitor steps into or out of the network. The contacts of the tap-changer can work in air. Alternatively, the tap changer can be located in a tank 10a as shown which can be filled with oil or an electronegative gas, for example $SF_6$, for increasing the breaking capacity of its contacts. An operating mechanism 11 for the tap-changer is arranged at ground potential and the operating movement is transferred to the tap-changer via an electrically insulating rod 111.

Figure 4:
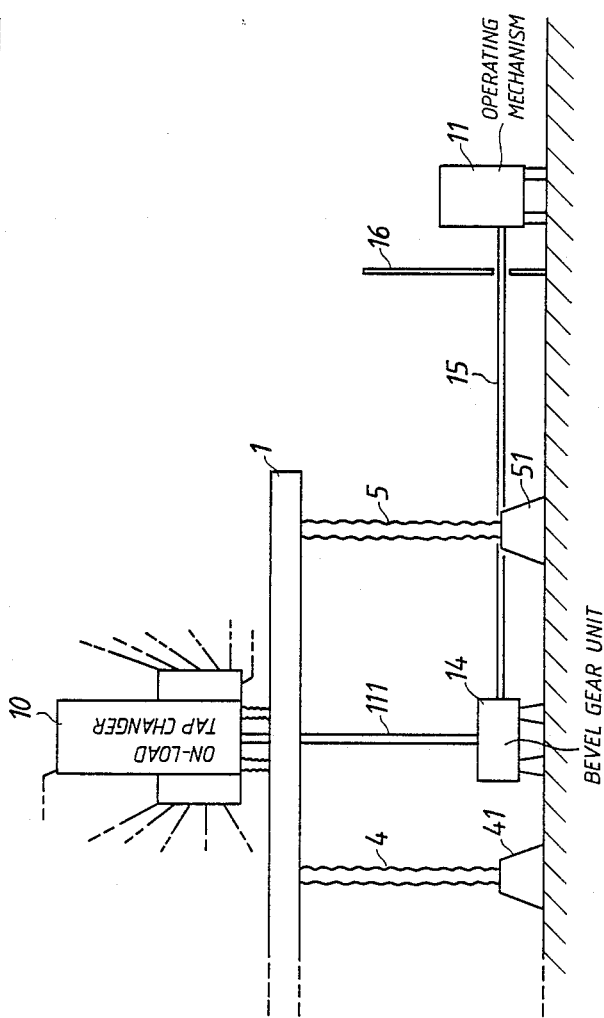
FIG. 4 is a scrap view of part of the equipment shown in FIG. 3 with the operating member for the tap-changer arranged outside an enclosure housing the equipment.

For safety reasons, equipment of the above-described kind would usually be surrounded by a fence 16, which is schematically shown in FIG. 4. The operating mechanism 11 of the tap-changer can be placed outside this fence, the operating movement then being transmitted to the tap-changer via a rod or a tube 15, a bevel gear unit 14 and the insulating rod or tube 111. In this way, maintenance of the operating mechanism of the tap changer can be carried out without having to take the series capacitor equipment out of operation.

The three phases of series capacitor equipment according to the invention can be controlled either symmetrically, i.e. such that the reactances of the capacitor banks of the three phases are always equal, or unsymmetrically, which under certain conditions may be advantageous.

The resistance of the tap-changes shown in the foregoing embodiments (e.g. R1, R2 in FIG. 1) can be replaced by inductors.

The embodiments described above have a fixed capacitor part (C) permanently connected into the line. If desired this part may be omitted.

The embodiments of equipment according to the invention described above are only examples, and a great many other embodiments are feasible within the scope of the invention as defined in the following claims.

What is claimed is:

1. Series capacitor equipment for connection into a power line, comprising a plurality of capacitor modules which can be switched in as and when required to adjust the reactance added to the line, and switching members for altering, during operation of the line, the number of modules contributing to the reactance of the line, said switching members comprising a transformer on-load tap-changer having sequentially oprating contact members as well as impedance elements arranged so as to prevent direct short-circuiting of the capacitor modules, the contact members of the tap-changer being arranged at the potential of the power line on a platform electrically insulated from ground potential, the drive device of the tap-changer being arranged at ground potential and being mechanically connected to the contact members via an electrically insulating means for the transmission of the operating movement.

2. Series capacitor equipment according to claim 1, in which said impedance elements consist of resistance.

3. Series capacitor equipment according to claim 2, in which the contact members of the switching members are housed in a tank filled with breaking medium different from air.

4. Series capacitor equipment according to claim 3, in which the breaking medium is an electronegative gas.

5. Series capacitor equipment according to claim 1, in which the contact members of the switching members are housed in a tank filled with breaking medium different from air.

6. Series capacitor equipment according to claim 5, in which the breaking medium is an electronegative gas.

* * * * *